United States Patent [19]

Becker

[11] 4,282,971
[45] Aug. 11, 1981

[54] CONVEYOR BELT CHAIN AND METHOD FOR ITS USE

[75] Inventor: Harry R. Becker, Utica, Pa.

[73] Assignee: Joy Manufacturing Company, Pittsburgh, Pa.

[21] Appl. No.: 82,370

[22] Filed: Oct. 5, 1979

[51] Int. Cl.³ .............................................. B65G 15/28
[52] U.S. Cl. ..................................... 198/846; 198/834
[58] Field of Search ............... 198/821, 831, 834, 844, 198/846, 847, 849, 850; 74/245 R, 245 C, 248, 249, 250 R, 250 C; 305/35 EB, 57

[56] References Cited

U.S. PATENT DOCUMENTS

| 1,134,688 | 4/1915 | McWhorter | 198/834 |
| 4,061,223 | 12/1977 | McGinnis | 198/821 |

FOREIGN PATENT DOCUMENTS 587791  5/1947  United Kingdom ..................... 198/850

*Primary Examiner*—Jeffrey V. Nase
*Attorney, Agent, or Firm*—Arnold B. Silverman

[57] ABSTRACT

Stretching of a conveyor belt to prevent edge spillage during horizontal turns is achieved with a new and improved chain extending longitudinally of the belt intermediate its side edges and secured to the belt. The chain is formed of alternate links, one of which is a C-shaped link secured to the belt and the other of which is a connecting link adapted to be engaged by a twin-drive sprocket. The links are loosely fitted such that the C-shaped links can be secured to the belt with a minimum distance between links and thereafter pulled apart to stretch the belt to which the chain is attached.

3 Claims, 4 Drawing Figures

U.S. Patent   Aug. 11, 1981   4,282,971
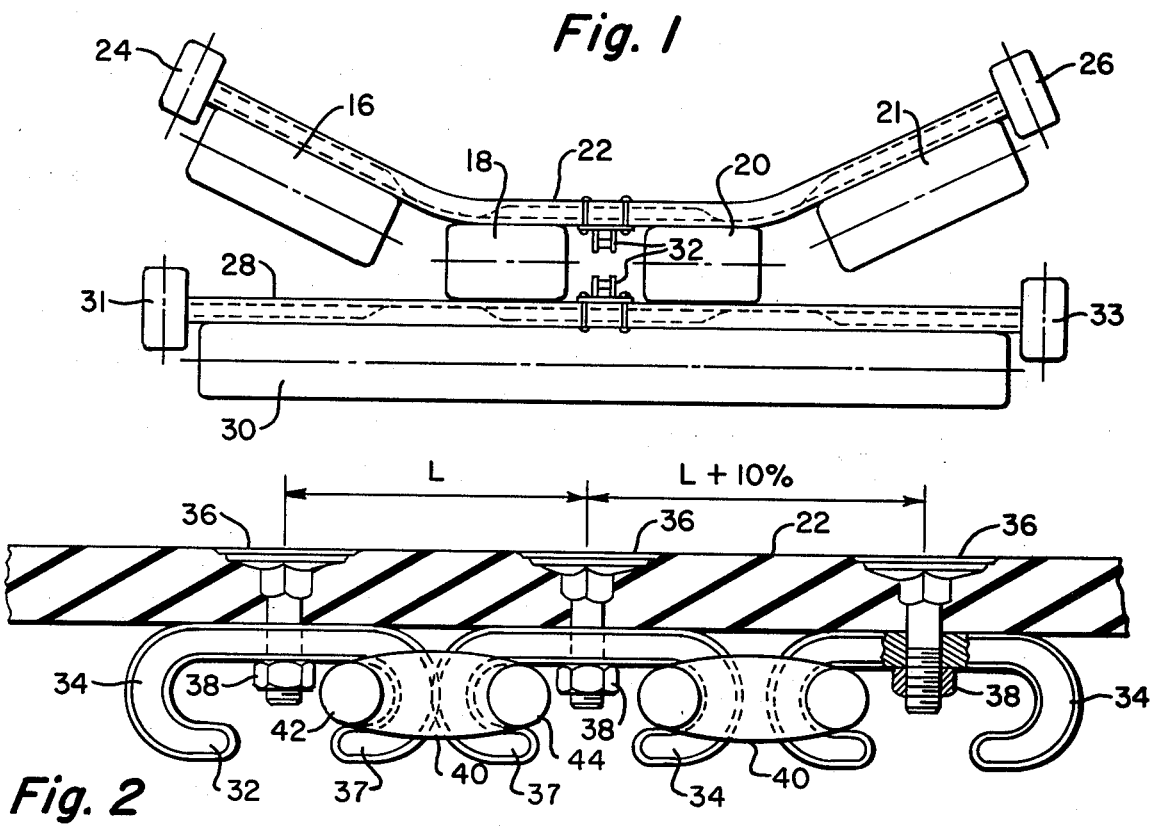
Fig. 1
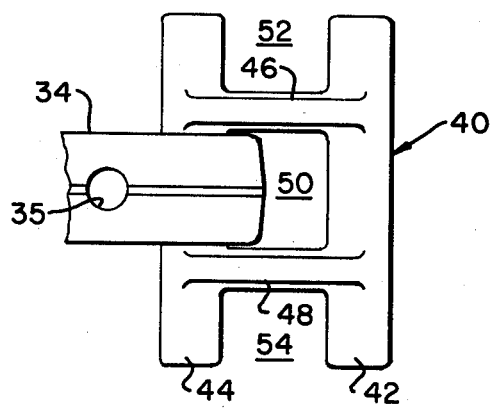
Fig. 2
Fig. 3
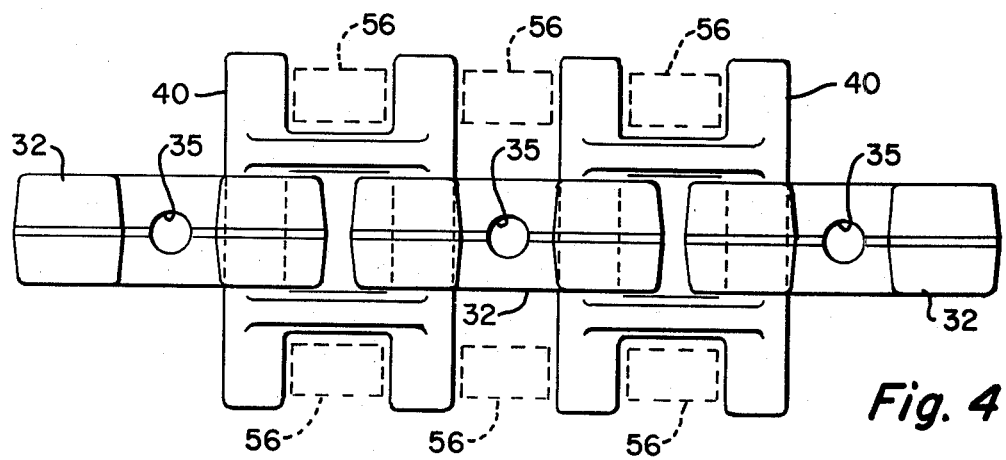
Fig. 4

CONVEYOR BELT CHAIN AND METHOD FOR ITS USE

BACKGROUND OF THE INVENTION

The present invention relates to conveyor belts for granular material and the like which may have a U-shaped upper reach and which can negotiate turns in a horizontal direction. In the past, belts of this type have been devised employing centrally-located cables to transmit the required belt tension and "sinusoidal" waves or flutes molded in the edges of the belt to accommodate elongation of shortening of the edges during a turn. That is, the flutes are designed to fold or unfold as required on a turn. Such flutes, however, add to the cost of the mold in which the belt is formed; and wet material tends to stick in the grooves on the working side and drop out on the return run to cause excessive "carry-back" or spillage problems. Additionally, when the belt runs over the drive drum, the flutes must elongate in an amount about twice the average edge elongation, resulting in fatigue failures of the elastomers which give a very limited life to the belt.

In U.S. Pat. No. 4,061,223, a stretchable belt conveyor designed for horizontal turns is disclosed in which a U-shaped conveyor belt is provided with reinforcing members extending transversely of the belt and spaced apart longitudinally of the belt. Elastic stretchable material is provided between the reinforcing members to permit pre-stretching the belt such that the edges remain in tension when the belt passes around curves and thereby maintains the molded shape of the belt in horizontal and vertical curves. The belt described in the aforesaid patent employs longitudinally-extending reinforcing members such as steel cables located in the central portion of the belt. The belt is described as being pre-stretched; however, no means is shown to enable pre-stretching, and particularly controlled pre-stretching, of the belt with the cables embedded therein.

In copending application Hoover Ser. No. 69,664, filed Aug. 24, 1979, and the specification of which is incorporated herein by reference, a belt conveyor is provided which eliminates the necessity for flutes at the edges of the belt and which is stretched so that the edges remain in tension when the belt passes around horizontal curves. In one embodiment, pre-stretching of the belt is achieved by riveting or otherwise fastening the belt to a chain which has loose pin connections to permit the chain to elongate and stretch the belt. That is, when the chain is attached to the conveyor belt during assembly, the chain links are, in effect, pushed together; but when the belt is installed on the conveyor, the chain links will be pulled apart by the maximum amount permitted by the loose pin connection to thereby stretch the belt to a predetermined elongation over its relaxed length.

SUMMARY OF THE INVENTION

In accordance with the present invention, a new and improved expansible chain for conveyor belts is provided which is formed of alternate links, one of which is a C-shaped link secured to the belt and the other of which is a connecting link adapted to be engaged by a twin-drive sprocket. The links are loosely fitted such that the C-shaped links can be secured to the belt and thereafter pulled apart in a novel method to stretch the belt.

The above and other objects and features of the invention will become apparent from the following detailed description taken in connection with the accompanying drawings which form a part of this specification, and in which:

FIG. 1 is an elevational cross-sectional view showing the manner in which the belt conveyor of the invention is supported;

FIG. 2 is a cross-sectional elevational view of the chain assembly of the invention attached to a conveyor belt;

FIG. 3 is a top view of two adjacent links in the chain assembly shown in FIG. 2; and FIG. 4 is a bottom view of the chain of the invention showing the manner in which a twin sprocket drives the chain and the belt attached thereto.

With reference now to the drawings, and particularly to FIG. 1, a set of four upper rolls 16, 18, 20 and 21, carried on a suitable frame, not shown, support the upper reach of a conveyor belt 22 such that the belt assumes, in cross section, a trough or U-shaped configuration. Edge rolls 24 and 26 are provided at spaced points along the upper reach of the conveyor to guide the belt and prevent it from moving from side-to-side. The belt 22 passes around drums at opposite ends of the conveyor and has a lower reach 28 which is guided on a flat roll 30 carried on the aforesaid frame. Edge rolls 31 and 33 are also provided for the lower reach. As will be understood, a plurality of frames and their associated rolls are spaced along the length of the upper and lower reaches of the belt conveyor system. The present invention is concerned with a chain 32 secured to the midsection of the belt 22 intermediate its opposite edges.

With reference now to FIG. 2, the chain 32 comprises alternate C-shaped links 34 each provided with a central opening 35 through which a flathead bolt 36 extends, the bolts 36 serving to secure the links 34 to the belt 22 when the nuts 38 are threaded onto the lower end of the bolts. Intermediate the links 34 are links 40 which have a configuration perhaps best shown in FIG. 3. The links 40 are preferably forged and comprise spaced cylindrical portions 42 and 44 around which hooked end portions 37 of links 34 extend. The cylindrical portions 42, 44 are captively retained in engagement with the respective links 34 when nuts 38 are in place as shown in FIG. 2. The cylindrical portions 42 and 44, in turn, are interconnected by means of bridges 46 and 48 which provide a central aperture 50, through which the hooked end portions 37 of the links 34 extend, and slots 52 and 54 which receive the teeth of a twin sprocket wheel, which is not shown. In FIG. 4, the teeth of the sprockets are indicated generally by the reference numeral 56. It can be seen that teeth 56 enter the slots 52 and 54 of the chain links 40 as well as the space between the links 40 on either side of the links 34 to drivingly engage respective parts of cylindricals portions 42, 44 outboard of bridges 46, 48.

In FIG. 2, two of the links 34 are shown in abutting relationship; while the central link and the right-hand link are shown separated such that tension is transmitted from one link 34 to the next through link 40. In assembling the belt conveyor, holes are provided on the belt 21 at a spacing L while the belt is unstretched. When the bolts 36 are inserted through the openings in the belt 22 and secured to the links 34, the links will be in abutting relationship or at least out of pulling engagement with a connecting link, as shown by the left and center link in FIG. 2. When, however, the belt and chain assembly is applied to the conveyor, its length is only 90%, for example, of the total length required. As a consequence, to secure the ends of the assembly together, the belt must be stretched, in this case 10%, such that the spacing between bolts 36 will be L+10% L and the links of chain 32 will be in tension sustaining engagement as illustrated by the center and right link in FIG. 2. This condition represents the upper limit of belt stretching as the chain is not further expansible. The belt is thus stretched, including its opposite edges, such that as the belt negotiates a horizontal turn in which the inside edge of the belt is relaxed less than 10%, that belt edge will nevertheless have enough residual stress to prevent edge spillage. At the same time, the links 34 and 40 facilitate easy turning of the chain during a horizontal turn.

Although the invention has been shown in connection with a certain specific embodiment, it will be readily apparent to those skilled in the art that various changes in form and arrangement of parts may be made to suit requirments without departing from the spirit and scope of the invention. In this respect, the C-shaped links 34 may have the central portions thereof widened to provide greater cross-sectional area for greater strength where the central opening necessitates the width. Furthermore, it will be appreciated that instead of securing the C-shaped links to the belt, it is also possible to secure the links 40 to the belt with two fasteners each.

I claim as my invention:

1. In a conveyor belt of the type comprising an elongated web of resilient material and a chain adapted to be driven by engagement with teeth of a dual sprocket drive extending along the longitudinal length of said web and having selected links secured to said web intermediate its edges; the improvement in said chain comprising a strand of alternate links one of which is a C-shaped link secured to said belt and the other of which is a connecting link which permits the C-shaped links on either side to approach each other or to separate until they engage the connecting link to transmit pull thereto, the C-shaped links being connected to the belt while out of pulling engagement with forward and aft connecting links whereby, when tension is applied to the chain, the C-shaped links will pull apart to stretch said belt along its longitudinal axis and, said connecting links each comprise spaced crossbar portions interconnected by spacers to provide a central opening through which hooked portions of the C-shaped links extend, and slots at the edges of said connecting link which receive the teeth of a dual-sprocket drive.

2. The improvements of claim 1 wherein said crossbars are circular in cross section.

3. In a conveyor belt of the type comprising an elongated web of resilient material and a chain adapted to be driven by engagement with teeth of a dual sprocket drive extending along the longitudinal length of said web and having every other link secured to said web intermediate its edges; the improvement in said chain comprising a strand of alternate links one of which is a connected link secured to said belt and the other of which is a connecting link having spaced transversely-extending crossbar portions which form a part of the pivotal connection between adjacent links, said crossbar portions extending outboard of the connected links and being drivingly engageable with the teeth of a dual-drive sprocket outboard of the link connections, the connected and connecting links being loosely fitted when the connected links are secured to said belt whereby, when tension is applied to the chain, adjacent links will tend to move apart to stretch said belt.

* * * * *